United States Patent Office 3,505,909
Patented Apr. 14, 1970

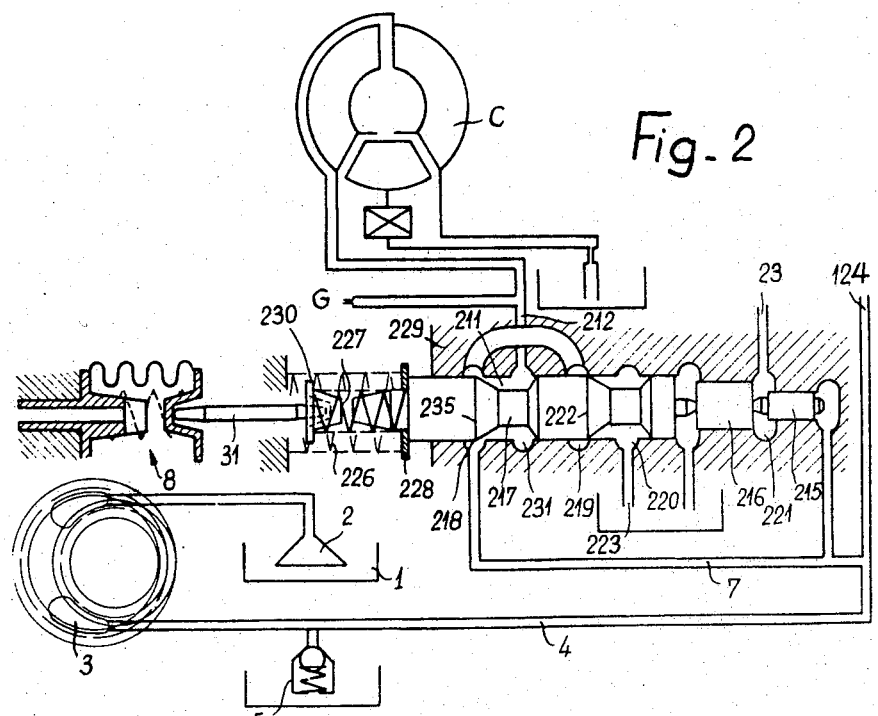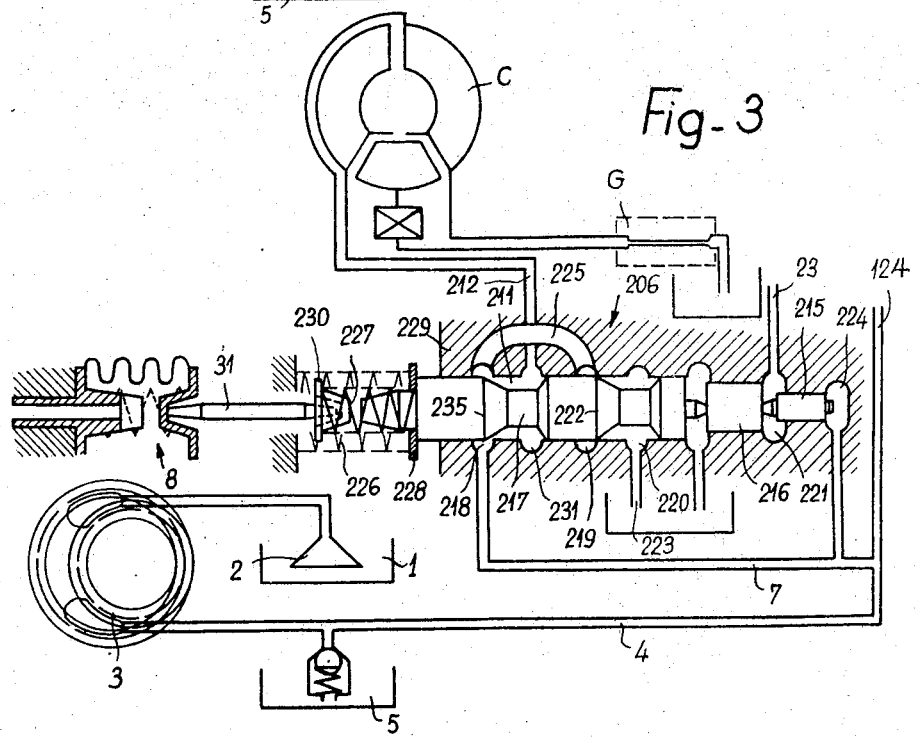

3,505,909
HYDRAULIC CONTROL DEVICES FOR AUTO-
MATIC TRANSMISSION OF AUTOMOTIVE
VEHICLES
Jean Maurice, Billancourt, France, assignor to Regie
Nationale des Usines Renault, Billancourt, and Auto-
mobiles Peugeot, Paris, France
Filed Apr. 4, 1968, Ser. No. 718,893
Claims priority, application France, May 3, 1967,
105,119
Int. Cl. B60k 21/14
U.S. Cl. 74—864					8 Claims

ABSTRACT OF THE DISCLOSURE

A valve for regulating the pressure of the fluid de-
livered to the transmission receivers is associated with a
variable-elasticity connection responsive to the suction in
the induction manifold of the vehicle engine, and a man-
ual shift valve coupled with electric control means and
capable of producing the various conditions of operation
of the transmission is associated with a hydroelectric
control valve having electric control means and a relay
valve permitting an additional regulation of the pressure
of the fluid delivered to said transmission receivers.

The present invention relates to a hydraulic control
system for an automatic transmission of the stepped type
providing three forward gears with under-torque gear shift
and one reverse gear.

It is an important object of this invention to provide
a device of this character which is both simple and easy
to manuafcture, has reduced over-all dimensions and per-
mits the change from one forward gear to another with-
out disconnecting the mechanical coupling or drive be-
tween the input and output shafts of the gearbox of the
transmission mechanism. This device comprises a rela-
tively small number of valves, thus reducing fluid leak-
ages. It is also adapted to be associated with electrical
control means capable of reducing to extremely short
values the response time of the hydraulic control device
under automatic operating condiitons. The invention may
be utilized without bringing any modification whatsoever
to the hydraulic circuit for different semi-automatic,
automatic or mixed layouts. Finally, the invention has
a high degree of safety in operation and in case of failure
of one element a transmission gear is obtained automati-
cally, this gear being generally a higher gear, or provid-
ing a lower reduction ratio, than the one initially contem-
plated so as to preclude any conditions likely to prove
hazardous for the proper driving of the vehicle.

The device according to this invention, in which a
source of fluid under pressure feeds hydraulic receivers
controlling the transmission, comprises a pressure regu-
lating valve in which the fluid balances the action of
resilient means, a hydroelectric valve controlling said
receivers, and wherein two monitoring electromagnetic
valves control a slide valve having two opposed and dif-
ferent pressure-responsive surface areas capable of giving
to the valve three fluid-distributing positions, and an elec-
tric control system responsive to the conditions of oper-
ation of the vehicle. The fluid pressure regulating valve
is associated, according to a predetermined law, with
a variable-elasticity connection creating for a given suc-
tion an effort varying but slightly with the regulating out-
put. This connection is responsive in a manner known
per se to the induction manifold of the internal com-
bustion engine of the vehicle, of which the suction con-
trols the fluid pressure to adapt it to the torques to be
transmitted by the aforesaid receivers, independently of
the fluid temperature. The connection further comprises
the combination of a manual shift valve, coupled with
an electric control device and adapted to provide different
operating conditions, whether automatic and/or semi-
automatic, of the transmission with a very short response
time, with said hydroelectric valve and its electric con-
trol system responsive to the conditions of operation of
the vehicle, and with the transmission receivers being fed
from said valves either directly or through the medium
of a relay valve providing an additional regulation of the
feed fluid pressure, other receivers being adapted to be
fed directly or not with the regulated fluid from said
source.

The electrohydraulic control valve of the device is
based on the principle of the hydraulic receiver control
device described and illustrated in the applicant's U.S.
patent application Ser. No. 663,626 filed Aug. 28, 1967
which is an improvement to Patent No. 3,234,857 of to
De Castelet.

The simplicity of the hydraulic circuit contemplated
in this invention is such that an electronic control device
described in the Patent No. 3,403,747 to De Castelet can
be associated therewith and the tachometric alternator
delivering a voltage proportional to the vehicle speed,
as described and illustrated in the U.S. Patent No. 3,344,-
294 to De Castelet and U.S. Patent 3,443,135 to De Caste-
let can be used in this control system.

Other advantages and features of the device accord-
ing to the present invention will appear more clearly as
the following description proceeds with refernce to the
accompanying drawing in which:

FIGURES 2 and 3 are diagrammatic views showing
modified forms of embodiments of the pressure regulating
valve;

Figure 1:
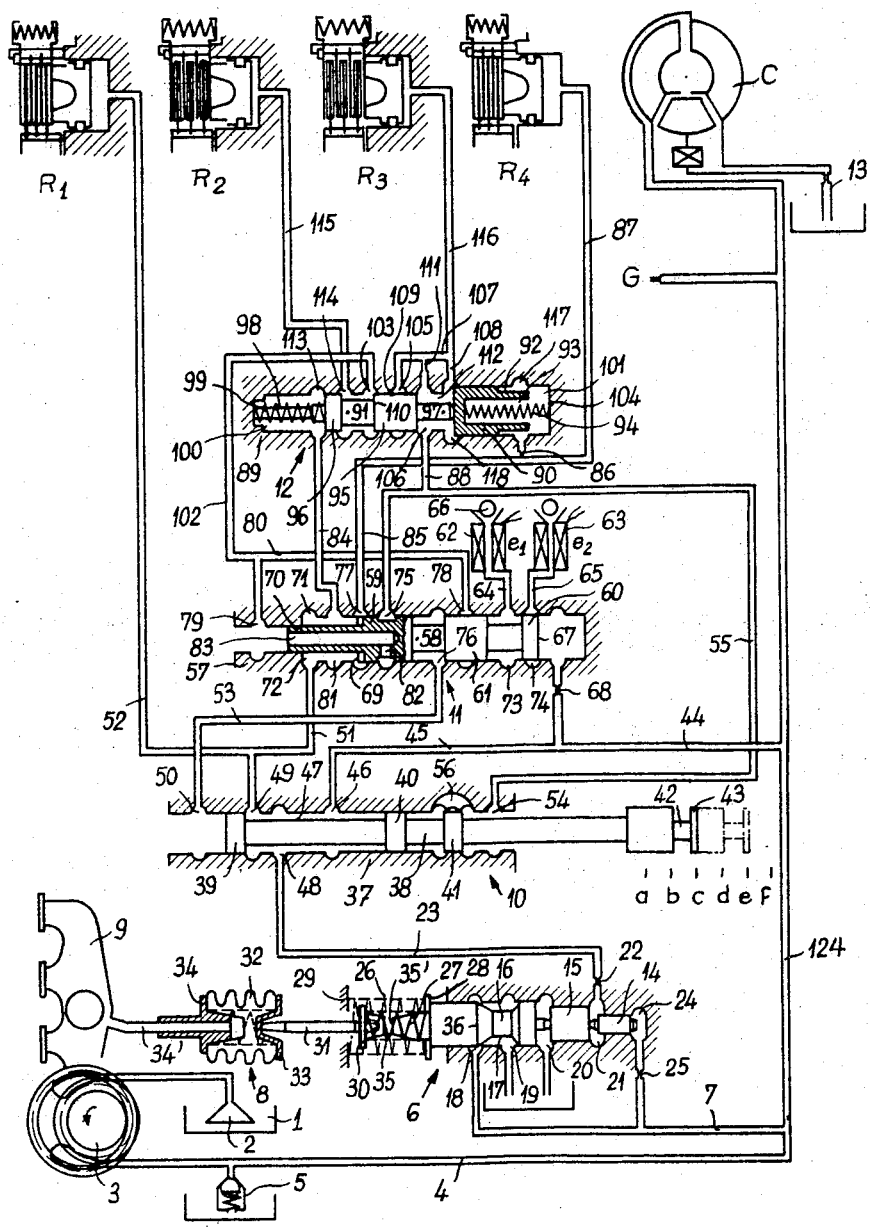
FIGURE 1 is a diagram showing the general layout of
the device of this invention.

Referring firstly to FIGURE 1, it will be seen that a
reservoir 1 supplies hydraulic fluid through a filter 2 to
an eccentric gear pump 3 delivering the fluid under pres-
sure through a conduit 4 equipped with an overpressure
valve 5.

A pressure regulating valve 6 connected to the conduit
4 by a branch line 7 receives from an elastic bellows 8
an information resulting from the suction produced in
the induction manifold 9 of the internal combustion en-
gine of the vehicle.

This device further comprises a manual shift valve des-
ignated by the reference numeral 10 and associated with
a hydroelectric valve 11. These valves control either di-
rectly or through the medium of a relay valve denoted
in general by the reference numeral 12 four hydraulic
receivers $R_1$, $R_2$, $R_3$ and $R_4$ consisting of friction devices
capable of receiving a torque increasing with the hy-
draulic pressure supplied thereto. These receivers control
in the known fashion an automatic transmission of the
epicyclic gear train type (not shown).

The fluid under the pressure regulated by the pump
3 supplied via a conduit 124, in addition to the circuit
of valves 10 and 11, a lubricating circuit G and a torque
converter circuit C adapted to provide in the conventional
manner the engine-transmission coupling and being pro-
vided with a throttled discharge 13.

The regulating valve 6 consists of three adjacent cylin-
drical slide valves 14, 15 and 16. Slide valve 16 comprises
two bearing portions separated by a groove 17. These
slide valves have different diameters to eliminate any
bearing and bore alignment problem. The valve body is
formed with a port 18 connected to the branch feed line 7 and also with ports 19 and 20 communicating with the fluid reservoir. Another port 21 is connected through a jet 22 and a pipe line 23 to the manual shift control valve 10. Another port 24 adjacent to slide valve 14 is connected via a jet 25 to said branch line 7.

These slide valves are urged by a pair of concentric springs 26 and 27 reacting with one end against a washer 28 bearing on one face of slide valve 16 and with the opposite end, respectively, against the valve block 29 for the first spring and against a cup 30 for the second spring. The position of this spring cup 30, which determines the pressure exerted by the spring 27, is responsive to, or monitored by, the elastic bellows unit or device 8 by means of a rod 31. This bellows unit or device 8 comprises a flexible or concertina sleeve 32 attached on the side of rod 31 to a cup 33 contacting said rod, and on the side of induction manifold 9 to a pipe 34 having a section 34' connecting the inner space of sleeve 32 with the induction manifold 9 of the engine, and also an adjustment system, not described but illustrated in FIGURE 5.

Figure 5:
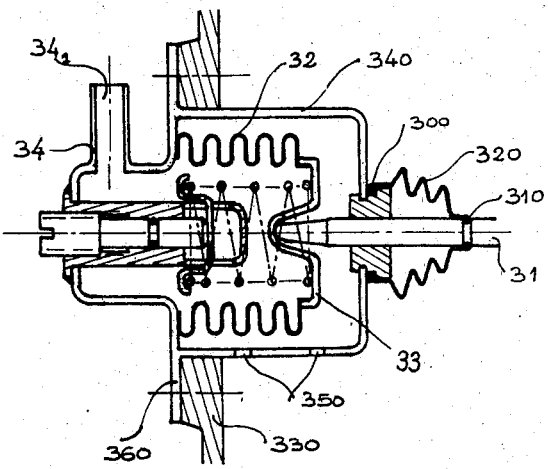
FIGURE 5 is another detail view showing the pressure
regulating bellows responsive to the engine suction.

As shown in detail in FIGURE 5 the bellows unit or device 8 further comprises an external flexible elastic sleeve 320 having its ends attached to the rod 31 and case 340. The elastic sleeve 320 is attached at 300 to the case 340 and at 310 to the rod 31, by means of snaprings, rings, collar or by the inherent resiliency of the end beads of the sleeve 320. The case 340 comprises a flange 360 engaging the inner face of casing 330 and is secured on the side of manifold 9 to the pipe 34. Moreover, two openings 350 are provided to permit the passage of air during the axial distortion of the inner bellows 32. This system is advantageous in that it permits the easy dismantling of the bellows unit 8 without interfering with the gearbox, the elastic sleeve 320 isolating the bellows from the oil contained in the transmission or gear case.

The force of springs 26 and 27, which depends on the engine power output demand, is balanced in the chambers formed by the ports 21 and 24 by the fluid pressure in circuit 4, which is regulated for the forward operation of the vehicle as a consequence of the leakage produced through the port 18. As will be explained presently, only the pressure produced at 24 will balance the force of the resilient system for driving the vehicle in reverse gear, so that the pressure can be regulated at a high value through the expedient of the leakage output produced through said port 18.

The jets 22 and 25 in the supply lines serve the purpose of damping out possible oscillations produced in the vibrating system consisting of the slide valve mass and of the elastic connection.

The principle of operation of the adjustment valve 6 is as follows:

As the elastic connection creates under predetermined conditions an effort varying but slightly for moderate slide-valve movements, the fluid pressure at 24, or at 24 and 21, will move the slide valve 16 backwards; its inner edge 36 opens the port 18 until the leakage through the port 19 to the reservoir creates a pressure capable of balancing the effort caused by the elastic connection.

This system is stable for the following reasons:

(a) An increment in the opening of port 18 will reduce the fluid pressure at 24, or at 24 and 21, thus causing this opening as a consequence of the movement of slide valve 16 towards 21;

(b) An increment in the fluid pressure will widen the port 18 and therefore the leakage produced therethrough, thus causing a reduction in this fluid pressure;

(c) An increment in the regulation fluid output will cause the fluid pressure to increase, and therefore the leakage at 18 will increase accordingly.

Under these conditions it will be possible, by using a volumetric pump of the constant cubic-capacity type but of the variable speed and therefore variable output type, to obtain a pressure regulated at a constant value for a given force of the elastic system.

When the engine throttle is closed, the vacuum produced within the bellows 8 is considerable. The effort transmitted from rod 31 via spring 27 to slide valve 16 is relatively moderate, and the effort transmitted through the high-flexibility spring 26 is practically constant. The combination of these various forces is calculated to produce the low operating pressure.

When the engine throttle is gradually opened the suction produced within the bellows 8 decreases; the effort thus transmitted via rod 31 and spring 27 to slide valve 16 increases but very moderately. The fluid pressure will therefore increase only very slightly up to a certain degree of opening of the engine throttle.

Figure 4:
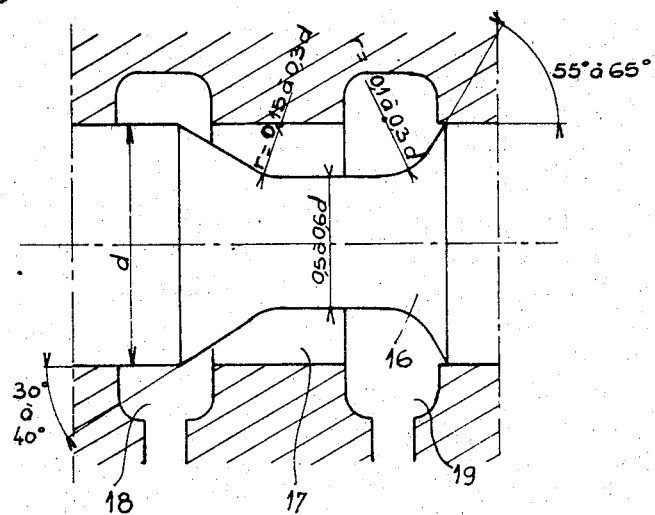
FIGURE 4 is a detail view showing the cylindrical
slide member of the regulation valve.

If the suction further decreases, the movement of rod 31 towards slide valve 16 will cause the end faces 35 and 35' of cup 30 and piston rod 16 to engage each other, thus neutralizing the action of spring 27 and causing the elastic action of the bellows, the engine suction and the action of spring 26 to act in parallel. The fluid pressure will then follow the value of the torque demand. The variable-elasticity system monitoring the pressure is advantageous in that it permits adjusting the regulated pressure under a full-throttle condition, without altering the level of the regulated pressure under closed-throttle conditions, and vice versa. Moreover, it was observed that the stability of the pressure regulating slide valve was obtained under better conditions by giving to the groove 17 of slide valve 16 the proportions illustrated in FIGURE 4.

The manual valve 10 consists of a cylinder 37 having slidably mounted therein a valve member 38 having three bearings 39, 40 and 41; a groove 42 at the end of this slide valve constitutes a control button 43. The valve is fed with fluid through conduits 124, 44 and 45 to a port 46 opening into the groove 47.

The positions obtained with this valve 10 correspond to the following conditions of operation:

(a) Low gear,
(b) High gear,
(c) Automatic or manual gear selection,
(d) Neutral,
(e) Reverse,
(f) Parking.

In position $a$ of button 43 which corresponds to the low gear the space limited by bearing portions 39 and 40 of slide valve 38 connects the port 46 with ports 48, 49 and 50. These ports supply respectively chamber 21 of pressure regulating valve 6 (of which the function has been set forth hereinabove) and receiver $R_1$, branch line 51 leading to the hydroelectric valve 11 and line 53 leading to valve 11. Another port 54 is provided for venting to the atmosphere the line 55 connected to valve 11 and 12.

In position $b$ of button 43, which corresponds to the high gear, the port 46 supplies ports 48 and 49 via groove 47 and therefore chamber 21 of valve 6 and receiver $R_1$, the latter being under pressure in all forward gear positions.

In position $c$ or automatic operation, which is the position shown in the figures, the hydraulic connections from valve 10 are the same as those obtained in position $b$.

The neutral position $d$, which is notably that obtained when the engine is idling and all the receivers have their fluid inlets closed, permits only the pressurizing of chamber 21 of valve 6 via port 48, in order to regulate the fluid pressure and permit the supply of fluid to the lubricating circuit G and hydraulic torque converter circuit C.

In the $e$ or reverse position of the manual valve, in which the control button 43 is shown in dash-and-dot lines in FIGURE 1, the bearing 39 of the manual valve isolates the port 48 from the feed port 46 and vents the former to the atmosphere. Port 54 communicates with port 46 via a duct 56, the bearing surface 41 isolating the former from the atmosphere. Port 48 also vents to the atmosphere the pressure in the chamber 21 of regulating valve 6 which is balanced only by the action resulting from the pressure in end chamber 24.

In the *f* or parking position the port 54 and line 55 are again connected to the atmosphere, and the other elements are positioned as in valve position *e*.

The manual valve may be operated in conjunction with an electric contactor (not shown) which may have various suitable layouts, since it can provide at will a semi-automatic and/or automatic operation.

The electrohydraulic valve 11 comprises a body 57 having a cylindrical bore slidably engaged by a cylindrical valve member 58 comprising end bearings 59 and 60 and an intermediate bearing surface 61. A pair of electromagnetic valves 62 and 63 control the three positions of the slide valve member.

The first position corresponds to the energization of both electromagnetic valves 62 and 63, by a control device such as the device of previously mentioned Patent 3,403,747 which causes their relevant ducts 64 and 65 to be closed by ball valves 66. Since no controlled leakage takes place through these ducts, the surface 67 of slide valve 58 is responsive to the regulating pressure transmitted through a jet 68 connected to the branch feed line 44. Since the surface area 69 (reduced by a hollow sliding rod 70 on bearing portion 59) is smaller than surface area 67, the pressure applied to the former surface 69 by the fluid from port 71 and line 51 is lower than that applied to surface 67, and therefore the slide valve 58 will move to the left until the surface 69 engages the surface 72 of valve body 57.

The second position of slide valve 58 corresponds to the energization of electromagnetic valve 63 alone. The end 67 of bearing portion 60 will then register with port 73 and thus create a leakage in this port and therefore a fluid output through the jet 68. This output is such that the fluid pressure received by surface 67 will just balance the effort caused by the fluid pressure on the annular surface 69.

The third position illustrated in the drawing is obtained when neither of the electromagnetic valves 62 and 63 is energized. Then the end 67 of slide valve 58 will register with port 74.

Besides, ports 71, 75 and 76 of valve 11 will then communicate respectively with ports 49, 54 and 50 of manual valve 10 via the corresponding lines 51, 55 and 53.

The following table shows the energized or de-energized conditions of electromagnetic valves 62 and 63 of valve 11 in the different positions of manual valve 10. The same table further indicates the corresponding couplings obtaining with receivers $R_1$ to $R_4$.

The electrohydraulic valve 11 operates as follows in the various positions of manual valve 10:

(a) Valve 10 is in the "low gear" position. The annular surrface area 69 of slide valve 58 engages the surface 72 of valve body 57. The ports 71 and 76 of valve 11 receive fluid under pressure from ports 49 and 50 of valve 10; port 75 is responsive to the atmospheric pressure through port 54 of valve 10. The ports 75 and 76 communicate with ports 77 and 78 respectively. The former is thus at atmospheric pressure, via line 55, and the latter is connected to port 79 via line 80 but isolated in this specific operating position by the bearing 70 of slide valve 58; on the other hand it permits the flow of fluid towards the valve 12. Port 81 is put at the atmospheric pressure by means of a hole 82 and bore 83 of rod 70.

(b) and (c). Manual valve 10 is in the "high gear" or "automatic" position, and fluid under pressure is applied to port 71 and surface 67 of the slide valve member. In the "high gear" position this is obtained electrically, because the device (not shown) but known per se controlling the valves 62 and 63 and receiving itself the information concerning the position shown by the control lever of the manual valve 10, in all operation cases of the vehicle, authorizes only two combinations for energizing of the electro-valves 62 and 63 which allow to obtain the two corresponding lower gears, namely:

Low or first gear: 62 and 63 are energized,
Intermediate or second gear: only 63 is energized.

In the "automatic" position the three forward gears are obtained by means of the following combinations:

(1) Low or first gear: both electromagnets 62 and 63 are energized.

The two surface areas 69 and 72 of valve 11 contact each other. Ports 76 and 78, 75 and 77, 81 are vented to the atmosphere respectively through line 53 and port 50 of valve 10, line 55 and port 54 of the same valve, hole 82 and bore 83 of rod 70 of valve 11.

The fluid under pressure is thus not directed towards the relay valve 12 but fed directly through line 52 to the first receiver $R_1$.

(2) Intermediate or second gear: 63 is energized.

The end 67 of slide valve 58 is then stopped to register with port 73. Both ports 71 and 81 communicate with each other and duct 84 connects port 81 with valve 12. The ports 79, 77, 75 and 76 are vented to the atmosphere respectively through the end of valve 11, the hole 82 and bore 83, line 55 and port 54 of valve 10, line 53 and port 50 of valve 10.

(3) Top or third gear: Both electromagnetic valves 62 and 63 are de-energized.

Valve 11 is in the position illustrated in FIGURE 1. The ports 71, 81 and 77 receive fluid under pressure via line 51 and port 49 of valve 10, port 77 directs this fluid towards the relay valve 12 via duct 85 and jet 86, and then to the receiver $R_4$ via line 87, while receiver $R_1$ is supplied with fluid from port 49 of valve 10 and pipe line 52. The ports 78 and 79 interconnected by a duct 80 are brought to the atmospheric pressure by the left-hand end of valve 11. The port 76 is connected to the atmosphere through the line 53 and port 50 of valve 10.

|  | Imposed low gear with overrun | Forbidden top gear | Automatic or manual selection | | Neutral | Reverse | Parking |
|---|---|---|---|---|---|---|---|
|  | | | Manual valve position | | | | |
|  | a | b | c | | d | e | f |
| Gear ratio obtained | 1 | 1      2 | 1      2 | 3 | | R | |
| Energized electromagnetic valves | 62, 63 | 62, 63      63 | 62, 63      63 | 0 | 62, 63 | 62, 63 | 62, 63 |
| Couplings obtained | $R_1, R_3$ | $R_1$    $R_1, R_2$ | $R_1$    $R_1, R_2$ | $R_1, R_4$ | | $R_3, R_4$ | |

(d) The manual valve 10 is in the "neutral" position: the two electromagnetic valves 62 and 63 are energized, and the surfaces 72 and 69 of valve 11 engage each other. The ports 76, 71 and 75 of this valve are at atmospheric pressure. Ports 81 and 77 are connected to the atmosphere via respectively hole 82 and bore 83 of rod 70 of slide valve member 58, and port 75. The ports 78 and 79 are connected to the atmosphere via port 76. Under these conditions, the fluid under pressure cannot flow beyond the hydroelectric valve 11.

(e) The manual valve is in its "reverse" position: both electromagnetic valves 62 and 63 are energized and the surfaces 69 and 72 engage each other. Port 75 of valve 11 receives fluid under pressure via line 55 and port 54 of valve 10, which communicates with port 46 via duct 56. Ports 75 and 77 communicate with each other. Thus, the fluid under pressure is directed towards valve 12 on the one hand through duct 85 and jet 86, and on the other hand through lines 55 and 88. Ports 79, 71, 81, 76 and 78 are vented to the atmosphere.

(f) The manual valve is in its "parking" position: with valves 62 and 63 energized and surfaces 67 and 69 in mutual engagement. All the ports of valve 11 are connected to the atmosphere.

The electrohydraulic valve 11 acts as a safety valve whenever the electromagnetic valves are operated under conditions not consistent with the momentary position of manual valve 10. These abnormal circumstances may arise for example in case of a possible failure in the electric current supply to the coils of these electromagnetic valves, and also in case of leakage or jamming of these valves. This safety is such that it generates specific cases of fluid supply to the receivers which are consistent with the operation of the transmission on the one hand and not hazardous for the driver on the other hand, since it is designed to constantly give a gear higher than that given by the circuit before the failure. Besides, it will be noted that this arrangement is attended by appreciable advantages from the point of view of power efficiency because the number of leakages due to the piston surface areas under pressure is extremely reduced in the various operating positions (4 to 9).

The relay valve 12 consists of a cylinder 89 in which two cylindrical valve members 90 and 91 are slidably mounted. The first slide valve has a groove 92 and a bore 93 formed therein, the bore 93 receiving therein and compression coil spring 94; the other slide valve having a diameter somewhat smaller than the former has two bearing portions 95, 96 and comprises at its right-hand end a push-rod 97 engaging the slide valve 90, and at its left-hand end a rod 98 carrying a spring 99 of a force greater than that exerted by the other spring 94. However, when the chambers 100 and 101 at the two ends of cylinder 89 are under pressure, there is a limit pressure (due to the difference between the surface areas involved) which, when overstepped, will firstly compensate and then exceed the difference between the forces of the two springs.

The function of this relay valve is on the one hand to regulate the fluid pressure applied to receiver $R_3$, in the "low gear" position, by setting this pressure at a value depending on the torque to be transmitted from the receiver to the coasting or overrun engine condition, and on the other hand to create between the intermediate and top gears an overlap necessary for producing an upshift or downshift free of any disengagement or break of continuity in the mechanical coupling or drive between the input and output shaft of the transmission mechanism, wtihout racing the engine and without producing any hunting likely to be felt by the driver.

In the "low gear" position the fluid under pressure is fed to the port 78 of valve 11 via duct 80, duct 102 and port 103. The ports 103 and 105 communicate with each other and the position of bearing 95 of slide valve 91 is such that port 106 is closed. The fluid under pressure, while supplying the receiver $R_2$ via line 115, flows through lines 107 and 108, exerts its pressure against the two pistons, keeps the slide valve 90 in contact with the end 104 of the cylinder and urges the slide valve 91 to the left, thus reducing the free surface area between the edge 109 of port 105 and the edge 110 of slide valve 91. Now a leakage output is produced through the jet 111, since port 106 is connected via pipe line 55 to the port 54 of valve 10 at atmospheric pressure. The leakage cross-sectional passage area between the edges 109 and 110 will decrease until the pressure drop in chamber 112 is such that slide valve 91 is balanced. The equilibrium thus obtained is stable because, for a given pressure upstream of valve 12, an increase (or a decrease) in the cross-sectional passage area between edges 109 and 110 will be attended by an increase (or a decrease) in the pressure in chamber 112, which increase (or decrease) tends to restore the valve 12 to its initial pressure condition. In the layout illustrated this relay valve will therefore adjust the fluid pressure delivered to receiver $R_3$ at a value consistent with the functions demanded thereto.

In the "intermediate" or "second gear" position the port 113 receives fluid under pressure via duct 84. Both slide valves 90 and 91 are in mutual contact and the former engages the cylinder end 104. Thus, ports 113 and 114 communicate with each other and port 114 permits the delivery of fluid under pressure through line 115 to receiver $R_2$. Receiver $R_3$ is vented to the atmosphere through lines 116 and 107, ports 105 and 103, duct 102 and port 79 of valve 11. Receiver $R_4$ is also vented to the atmosphere via lines 87 and 85, port 77, hole 82 and bore 83 of the piston rod 58 of valve 11.

When shifting from "intermediate" to "high gear," the supply of fluid to receiver $R_2$ is discontinued, from a predetermined pressure threshold, by the pressure increment in receiver $R_4$. In fact, when valve 11 is in its "high gear" position, the fluid under pressure already being supplied to chamber 100 of relay valve 12 is directed to chamber 101 via duct 85 and jet 86 and at the same time to receiver $R_4$ via duct 87. Since the cross-sectional area of piston 90 is greater than that of piston 91, the pressure differential gives rise to a threshold pressure which, when acting in chambers 100 and 101, causes the relevant slide valves to move to the left. The minimum operating pressure of this hydraulic circuit must be greater than this threshold pressure. When shifting from "intermediate gear" to "high gear," it is therefore necessary that the pressure attains a certain value in chamber 101 and therefore in receiver $R_4$ before the relay valve 12 cuts off the supply of fluid to receiver $R_2$. The reverse action is obtained when shifting down from "high gear" to "intermediate gear."

When the "reverse" position is engaged the ports 106 and 117 are supplied with fluid under pressure through port 54 of valve 10 and ducts 55 and 88 (for the first port 106) and through ports 75 and 77 of valve 11, duct 85 and jet 86 (for the other port 117). Slide valves 90 and 91 are moved to the left as seen in FIGURE 1, thus interconnecting ports 106 and 118. Under these conditions, receivers $R_3$ and $R_4$ are actuated by the pressure transmitted via lines 87 and 116.

In addition to the safety of operation of the electrohydraulic device, the hydraulic device per se is characterised by the valuable feature of strictly forbidding the delivery of pressure fluid to the receivers in all cases inconsistent with the specific conditions of operation of the transmission which are set forth in the table given hereinabove.

An alternate form of embodiment of the regulation valve is illustrated in FIGURES 2 and 3 of the drawing, wherein the valve is adapted to supply regulated fluid directly to the lubricating circuit G and to the hydraulic torque converter C, in parallel in FIGURE 2 and in series in FIGURE 3. The principle of operation is the same as in the layout illustrated in FIGURE 1 and the delivery of pressure fluid to receivers $R_1$ to $R_4$ is unchanged.

In the modified arrangement shown in FIGURES 2 and 3 the regulation valve 206 is still responsive to the suction transmitted thereto from the elastic bellows 8 by means of a rod 31. The valve comprises three valve members 215, 216 and 217 slidably fitted in a bore of cylinder 229, the last slide valve member 217 having three cylindrical guiding or bearing surfaces separated by two annular grooves 211. The elastic means for transmitting the suction is the same as in the arrangement of FIGURE 1 and comprises a washer 228, a cup 230 and two coaxial springs 226 and 227.

The pressure obtained in chamber 224, or in chambers 224 and 221, respectively in the "reverse" gear shift position and in all the other operative positions, moves the slide valve 217 to the left. The edge 235 of this slide valve thus opens the port 218 for regulation outputs not in excess of a predetermined value. For a predetermined pressure regulation value there is a maximum output that can flow through the line 212 to the lubricating and converter circuits G and C.

If the regulation output exceeds this maximum value, the pressure tends to increase, thus moving the slide valves 215, 216 and 217 to the left until the edge 222 of slide valve 217 uncovers the port 219 connected by a duct 225 to the port 218 through which regulated fluid can be delivered to the lubricating circuit G and torque converter circuit C via a groove 211, port 231 and duct 212. The excess output not supplied to the hydraulic circuits G and C can thus escape to the fluid reservoir via port 220 and return line 223.

Of course, the valves of the control device of this invention can be assembled and incorporated into a very compact unit adapted to be easily enclosed in the lower portion of the transmission case. The manufacture of these units is facilitated by the small number of valves which may have parallel axes and disposed in a common plane.

The above-described hydraulic circuit may be associated for example with a suitable electric circuit. It would not constitute a departure from the spirit and scope of the invention to associate this hydraulic circuit with other electric circuits permitting, in addition to the various automatic-operation combinations, a "semi-automatic" operation, the specific electric circuit being a matter of choice not limiting the scope of the invention.

Besides, many modifications and variations may be brought to the practical embodiment of the invention without departing from the basic principles thereof as set forth in the appended claims.

I claim:

1. In an automotive vehicle having an internal combustion engine with an induction manifold providing a vacuum varying with the engine load, a stepped automatic transmission having three forward gears with undertorque shift and one reverse ratio, a source of pressure fluid, and transmission control hydraulic receivers supplied by said fluid pressure, a hydraulic device for controlling said transmission and comprising a fluid pressure regulating valve having sliding members in a cylinder connected to said fluid source, a vacuum responsive resilient connection between said manifold and said valve, an electro-hydraulic valve comprising a sliding member having two opposed and different pressure-responsive surface areas associated to two monitoring electromagnetic valves controlling said sliding member and capable of giving it three fluid distributing positions, a control system of said electrohydraulic valve responsive to the conditions of operation of said vehicle, a manual shift valve, a control device for said shift valve, and a relay valve, wherein said pressure regulating valve being connected with said vacuum responsive resilient connection and creates as a function of manifold vacuum a fluid pressure adapted to the torques to be transmitted by said receivers independently of said fluid temperature, said electrohydraulic valve in combination with said manual shift valve being adapted to be coupled to an electric control device and to provide different operating conditions by transmitting pressure fluid to some of said receivers, said electrohydraulic valve and shift-valve being further in combination with said relay valve to feed some others of said receivers, said relay valve providing an additional pressure fluid regulation, and other receivers being adapted to be fed directly with said fluid from said source regulated by said regulation valve.

2. A hydraulic control device according to claim 1, wherein said vacuum responsive resilient connection is a variable resiliency means and comprises a first spring of relatively great flexibility and of substantially constant force, a second spring of which the force varies but slightly for small movements of said regulating valve sliding members, and an elastic member connected to said induction manifold and actuating said springs, said elastic member being inoperative when said manifold vacuum exceeds a predetermined threshold value.

3. A hydraulic control device according to claim 2, further comprising an elastic member comprising a closed elastic bellows of which the inner space is connected to said engine manifold, said resilient connection further comprises on the one hand a rod adapted to transmit the bellows movements to said regulation valve sliding members, a first cup rigid with said bellows and a second cup rigid with one end of said second spring, said rod interconnecting the two cups.

4. A hydraulic control device according to claim 3, further comprising a case inserted into a corresponding opening in the casing of said transmission and enclosing said bellows and said first cup, and an elastic sleeve isolating said case from said transmission casing, said sleeve having one end secured to said rod and the other end to the part of said case which is inside of said transmission casing.

5. A hydraulic control device according to claim 1, further comprising an electric switch of an electric control device, having different operative positions operatively connected to said manual shift valve to permit semi-automatic and automatic shift valve operations.

6. A hydraulic control device according to claim 1, wherein said control system of said electrohydraulic valve comprises an electronic device having a very short response time and which is responsive in turn to various parameters, notably the vehicle speed, the engine load and the reaction torque, said system actuating said monitoring electromagnetic valves associated with said electrohydraulic valve.

7. A hydraulic control device according to claim 1, wherein said relay valve comprises two slide members having different surface areas responsive to said control fluid pressure, a cylinder in which said members slide and which is connected on the one hand to said electrohydraulic valve and to at least two of said hydraulic receivers on the other hand, said relay valve being further adapted to discontinue the supply of fluid to one of said receivers, for changing from intermediate gear to high gear and vice-versa, only when the pressure in a third receiver has attained a predetermined value, and to adjust the pressure of a hydraulic receiver of said transmission mechanism to obtain a torque transmitted by said receiver, which is consistent with its functions, in the first imposed operative position of said manual shift valve.

8. A hydraulic control device according to claim 1, wherein one of said slide members of said pressure regulation valve comprises three cylindrical bearing surfaces separated by two annular grooves adapted to regulate the fluid pressure system, one of said grooves being connected directly to hydraulic circuits other than those of said transmission control receivers, said valve having a duct formed in its cylinder and permitting interconnecting said grooves.

References Cited

UNITED STATES PATENTS

| | | | |
|---|---|---|---|
| 2,753,732 | 7/1956 | Harrison | 74—472 |
| 2,936,864 | 5/1960 | Schjolin et al. | |
| 3,225,619 | 12/1965 | Schaefer | 74—472 |

ARTHUR T. McKEON, Primary Examiner